US010406461B2

(12) United States Patent
Bippus et al.

(10) Patent No.: US 10,406,461 B2
(45) Date of Patent: Sep. 10, 2019

(54) APPLIANCE WATER FILTER SYSTEM HAVING MEMORY AND AUTHENTICATION FUNCTIONALITY

(71) Applicant: WHIRLPOOL CORPORATION, Benton Harbor, MI (US)

(72) Inventors: Melissa M. Bippus, Evansville, IN (US); Andrew M. Drees, Iowa City, IA (US); Wyndham F. Gary, Jr., Whitefish Bay, WI (US); Steven J. Kuehl, Stevensville, MI (US); Brent A. Rowland, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 330 days.

(21) Appl. No.: 15/237,351

(22) Filed: Aug. 15, 2016

(65) Prior Publication Data
US 2017/0050130 A1  Feb. 23, 2017

Related U.S. Application Data

(60) Provisional application No. 62/205,930, filed on Aug. 17, 2015.

(51) Int. Cl.
*B01D 35/143* (2006.01)
*C02F 1/00* (2006.01)
(Continued)

(52) U.S. Cl.
CPC .......... *B01D 35/143* (2013.01); *B01D 35/02* (2013.01); *C02F 1/003* (2013.01); *F25D 23/00* (2013.01);
(Continued)

(58) Field of Classification Search
None
See application file for complete search history.

(56) References Cited

U.S. PATENT DOCUMENTS

| 5,502,978 | A | * | 4/1996 | Field | C02F 1/283 |
| | | | | | 222/146.6 |
| 2007/0050157 | A1 | * | 3/2007 | Kahn | C02F 1/008 |
| | | | | | 702/55 |

(Continued)

FOREIGN PATENT DOCUMENTS

DE    102006029105 A1    12/2006

OTHER PUBLICATIONS

European Search Report and Written Opinion, issued in connection with European Application No. 16184351.1, dated Feb. 2, 2017, 7 pages.

(Continued)

*Primary Examiner* — Richard C Gurtowski
(74) *Attorney, Agent, or Firm* — Nyemaster Goode, P.C.

(57) ABSTRACT

A water filter system for an appliance includes a filter head assembly, a first appliance control unit positioned proximate the filter head assembly and a water filter having a memory storage unit. The water filter is selectively placed in communication with the first appliance control unit to define a filter use state. The filter use state is further defined by a first potential fluid-flow rate through the water filter and a predetermined lifetime fluid filtration amount. A data transfer mechanism defines a second data-transfer protocol between the memory storage unit and the first appliance control unit when an actual fluid filtration amount of the water filter reaches the predetermined lifetime fluid filtration amount. The second data transfer protocol defines a notifi-
(Continued)

cation state defined by a second potential fluid flow rate, the second potential fluid flow rate being less than the first potential fluid flow rate.

20 Claims, 8 Drawing Sheets

(51) Int. Cl.
*B01D 35/02* (2006.01)
*F25D 23/00* (2006.01)
*F25D 23/12* (2006.01)

(52) U.S. Cl.
CPC ........ *F25D 23/126* (2013.01); *B01D 2201/52* (2013.01); *B01D 2201/54* (2013.01); *C02F 2201/005* (2013.01); *C02F 2201/006* (2013.01); *C02F 2209/006* (2013.01); *C02F 2209/008* (2013.01); *C02F 2209/40* (2013.01); *C02F 2209/445* (2013.01); *C02F 2307/12* (2013.01); *F25C 2400/14* (2013.01); *F25D 2323/121* (2013.01)

(56) References Cited

U.S. PATENT DOCUMENTS

| | | |
|---|---|---|
| 2014/0144822 A1 | 5/2014 | Senninger |
| 2014/0223715 A1 | 8/2014 | Bippus et al. |
| 2015/0190745 A1 | 7/2015 | Lim et al. |

OTHER PUBLICATIONS

European Patent Office, "European Search Report," issued in connection with European Patent Application No. 16184341.2, dated Jan. 18, 2017, 6 pages.

\* cited by examiner

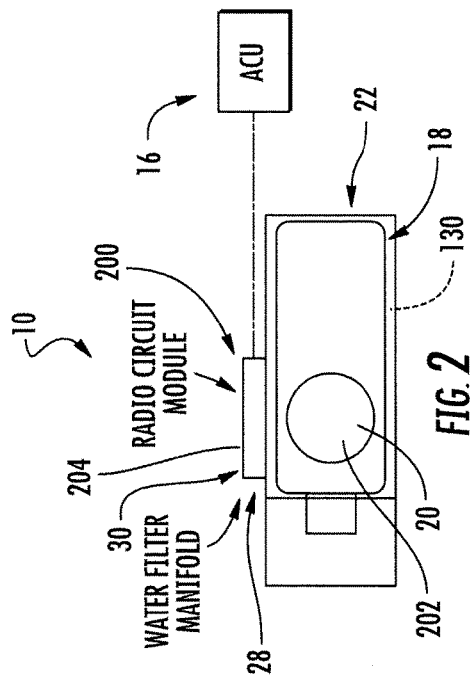
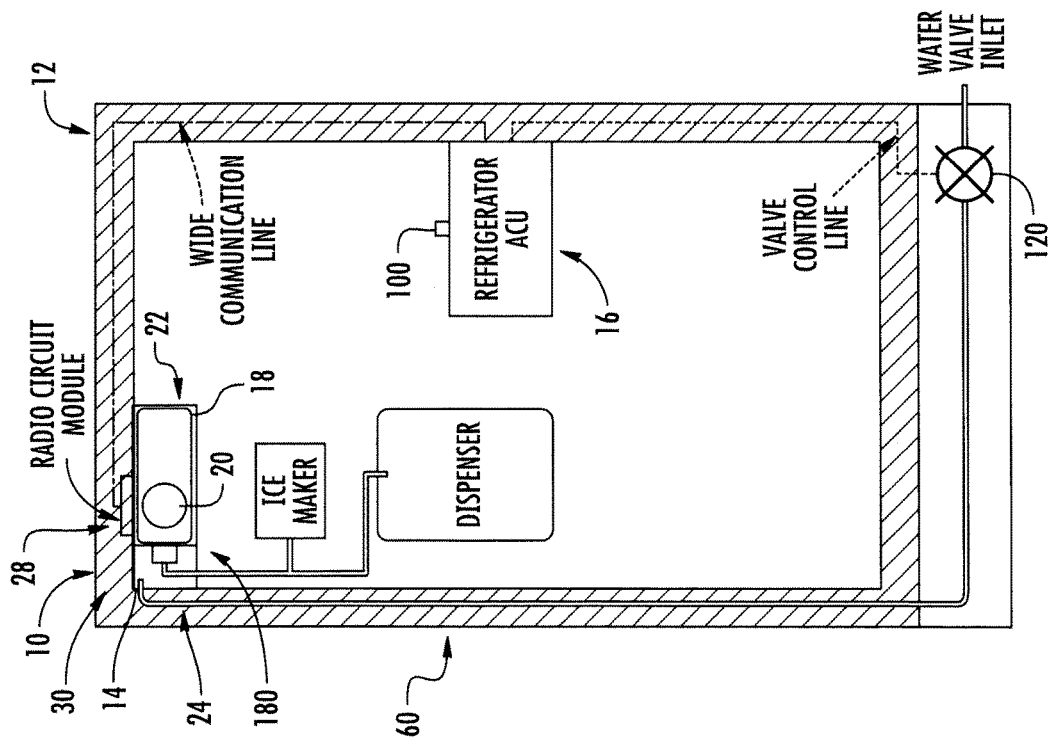

APPLIANCE WATER FILTER SYSTEM HAVING MEMORY AND AUTHENTICATION FUNCTIONALITY

CROSS-REFERENCE TO RELATED APPLICATION

This application claims priority to U.S. Provisional Application Ser. No. 62/205,930, filed on Aug. 17, 2015, entitled APPLIANCE WATER FILTER SYSTEM HAVING MEMORY AND AUTHENTICATION FUNCTIONALITY, the disclosure of which is hereby incorporated herein by reference in its entirety.

FIELD OF THE DEVICE

The device is in the field of water filtration systems, and more specifically, an appliance water filtration system having a memory for recording and communicating consumable status information and for providing authentication tags for use in conjunction with the appliance.

SUMMARY OF THE DISCLOSURE

In at least one aspect, a water filter system for an appliance includes a filter head assembly, wherein a first appliance control unit is positioned proximate the filter head assembly. A water filter includes a memory storage unit wherein the water filter is selectively placed in communication with the first appliance control unit to define a filter use state. The filter use state is further defined by a first potential fluid-flow rate through the water filter and a predetermined lifetime fluid filtration amount. A data transfer mechanism is in communication with the memory storage unit and the first appliance control unit. The data transfer mechanism provides for a first data-transfer protocol between the memory storage unit and the first appliance control unit that further defines the filter use state. The data transfer mechanism also defines a second data-transfer protocol between the memory storage unit and the first appliance control unit when an actual fluid filtration amount of the water filter reaches the predetermined lifetime fluid filtration amount. The second data transfer protocol defines an notification state defined by a second potential fluid flow rate, the second potential fluid flow rate being less than the first potential fluid flow rate.

In at least another aspect, a fluid filtration device for an appliance includes a water filter having a memory storage unit wherein the water filter is configured to be placed in selective communication with a first appliance control unit to define a unique filter identification tag. The unique filter identification tag defines a first fluid flow rate of a water filtration system of a first appliance. A data transfer mechanism is at least partially defined by the memory storage unit. The memory storage unit is placed in communication with the first appliance control unit. The data transfer mechanism, through cooperation of the memory storage unit and the first appliance control unit, defines a unique filter identification tag. The unique filter identification tag is at least partially stored within the memory storage unit, wherein after the unique filter identification tag is defined, the memory storage unit is free of cooperatively defining the unique filter identification tag with a second appliance control unit, wherein cooperation of the memory storage unit and the second appliance control unit defines a generic filter identification tag. The generic filter identification tag is configured to define a second fluid flow rate of a second water filtration system of a second appliance. The second fluid flow rate is less than the first fluid flow rate.

In at least another aspect, a method for installing and replacing a water filter for an appliance includes providing a water filter having a memory storage unit, where the water filter is configured for selective communication with a first appliance control unit to define a filter use state. The filter use state is further defined by a first potential fluid-flow rate through the water filter and a predetermined lifetime fluid filtration amount. According to the method, the water filter is installed in communication with the first appliance control unit to place the memory storage unit in communication with the first appliance control unit, wherein a data transfer mechanism is defined by communication between the memory storage unit and the first appliance control unit, and where the data transfer mechanism defines a first data transfer protocol that further defines the filter use state. Fluid is selectively provided through the water filter at the first potential fluid-flow rate until the actual fluid filtration amount of the water filter reaches the predetermined lifetime fluid filtration amount. A second data transfer protocol is defined through the data transfer mechanism when an actual fluid filtration amount of the water filter reaches the predetermined lifetime fluid filtration amount. The second data transfer protocol defines a notification state, and the second potential fluid flow rate is less than the first potential fluid flow rate. Next, the water filter is removed from communication with the first appliance control unit. The memory storage unit maintains the second data transfer protocol and is free of subsequently defining the first data transfer protocol. A replacement water filter has a replacement memory storage unit. The replacement water filter is configured for selective communication with the first appliance control unit to define the filter use state that is defined by the first potential fluid-flow rate through the replacement water filter and the predetermined lifetime fluid filtration amount. The replacement water filter is installed in communication with the first appliance control unit to place the replacement memory storage unit in communication with the first appliance control unit. The data transfer mechanism is typically defined by communication between the replacement memory storage unit and the first appliance control unit, and wherein the data transfer mechanism defines the first data transfer protocol that further defines the filter use state. The fluid is selectively provided through the replacement water filter at the first potential fluid-flow rate until the actual fluid filtration amount of the replacement water filter reaches the predetermined lifetime fluid filtration amount.

In at least another aspect, a method for providing an automatic water filter exchange program for consumers includes providing a water filter having a memory storage unit, whereby the water filter is configured for selective communication with a consumer's cell phone NFC reader once installed in the refrigerator. This will take the consumer to a web site where they can register and sign up for automatic filter replenishment with or without filter analysis. When the consumer signs up for analysis, they will receive a return post paid container to return the used water filter. Once returned, the water filter NFC tag is read and water testing results provided to the consumer.

Another aspect includes a fluid filtration combination system that includes: a fluid filtration device having: a water filter having a memory storage unit wherein the water filter is configured to be placed in selective communication with a first appliance control unit to define a unique filter identification tag. The unique filter identification tag defines a first fluid flow rate of a water filtration system of a first appliance. The system further includes a data transfer mechanism at least partially defined by the memory storage unit such that, when the memory storage unit is placed in communication with the first appliance control unit, the data transfer mechanism, through cooperation of the memory storage unit and the first appliance control unit, defines a unique filter identification tag. The unique filter identification tag is at least partially stored within the memory storage unit. After the unique filter identification tag is defined, the memory storage unit may be free of (prevented from) cooperatively defining the unique filter identification tag with a second appliance control unit. Additionally, the water filter may be further configured to be placed in communication with a mobile computing device that works in conjunction with the water filter and the memory storage unit of the water filter via a wireless data transfer device/system that typically includes an RFID reader associated with and typically engaged with or integrating into the mobile computing device such that the mobile computing device receives information about the water filter and optionally information stored in the memory storage unit of the water filter. It is also possible, but not necessary, as in other embodiments that cooperation of the memory storage unit and the second appliance control unit defines a generic filter identification tag, the generic filter identification tag may be configured to define a second fluid flow rate of a second water filtration system of a second appliance, the second fluid flow rate being less than the first fluid flow rate. The mobile computing device may be in wireless communication such that an automatic replacement of a water filter may be initiated and fulfilled. Additionally, the communication may prompt delivery of a package that receives the water filter when it is in an expired or used state. The package is typically pre-addressed to a testing facility and/or recycling facility to test and or recycle the used filter. The testing information, if conducted may be reported to the user via the mobile computing device and a replacement filter with filtering features and capabilities tailored to the water filtering needs of the user may be provided to the user thereafter as well.

Another aspect of the present disclosure includes a method of authenticating a water filter and/or communicating information about a water filter to a user via a user interface comprising the following steps: providing: a filter water filter system for an appliance, the water filter system characterized by: a filter head assembly; a first appliance control unit; a water filter having a memory storage unit engaged with the water filter; and a data transfer mechanism in communication with the memory storage unit and the first appliance control unit; positioning the water filter such that the memory storage unit is in communication with the first appliance control unit; communicating an initial startup protocol to the first appliance control unit after the water filter is initially engaged with filter head assembly and is in a first filter use state where water flows at an initial water flow rate to the user; communicating a subsequent data-transfer protocol between the memory storage unit and the first appliance control unit that overwrites the initial startup protocol; and providing information about the water filter to a user.

Another aspect of the present disclosure includes a system for communicating information about a water filter to a user a filter water filter system for an appliance, the water filter system characterized by: a filter head assembly; a first appliance control unit; a water filter having a memory storage unit engaged with the water filter where the water filter is engaged with the appliance in a manner to allow untreated water to enter the water filter and treated water to be provided to the user via the appliance; and a data transfer mechanism that includes the memory storage unit and the first appliance control unit in signal communication with one another. The system periodically reads and writes information to the water filter's memory storage unit and the memory storage unit includes data that may be used to display one or more of the following pieces of status or history information about the water filter to a user via a user interface: the time period of use of the water filter; the volume of water that has flowed through the filter; the percentage of use or percentage of remaining useful life of the filter; the model of the filter; and the model of the appliance to which the filter was initially engaged.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description of the device, will be better understood when read in conjunction with the appended drawings. For the purpose of illustrating the device, there are shown in the drawings, certain embodiment(s) which are presently preferred. It should be understood, however, that the device is not limited to the precise arrangements and instrumentalities shown. Drawings are not necessary to scale. Certain features of the device may be exaggerated in scale or shown in schematic form in the interest of clarity and conciseness.

FIG. 1 is a schematic, cross-sectional view of an appliance incorporating a water filter having an aspect of a memory storage unit for defining a data transfer mechanism;

FIG. 2 is an enlarged schematic view of the water filtration system for the appliance of FIG. 1 showing the water filter engaged within a filter head assembly of the appliance;

DETAILED DESCRIPTION

Figure 3:
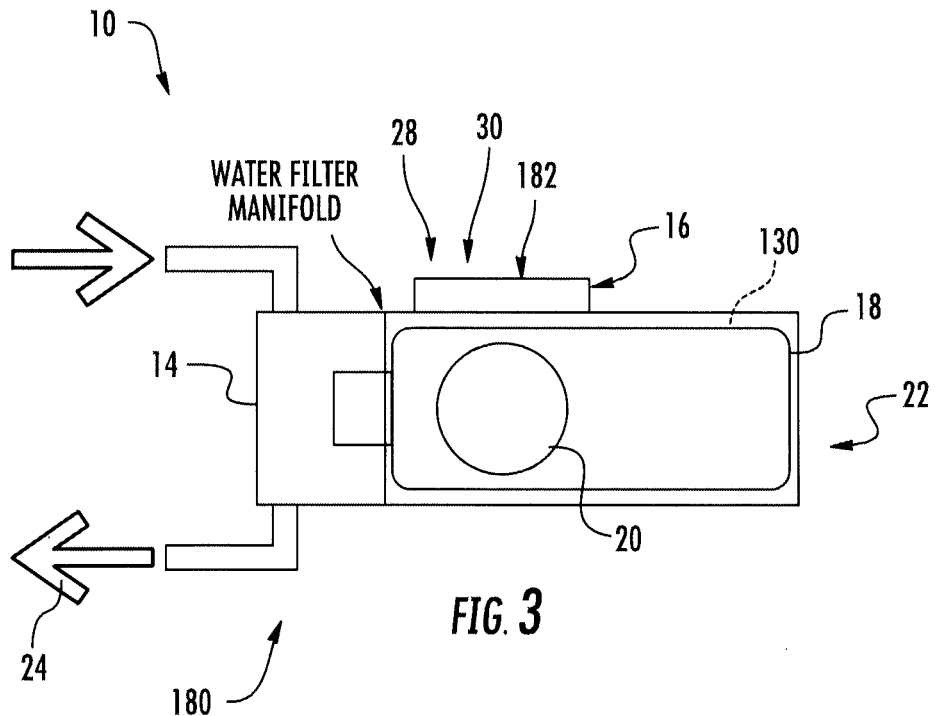
FIG. 3 is a schematic view of the water filter system showing the water filter operating during the filter use state.
Figure 4:
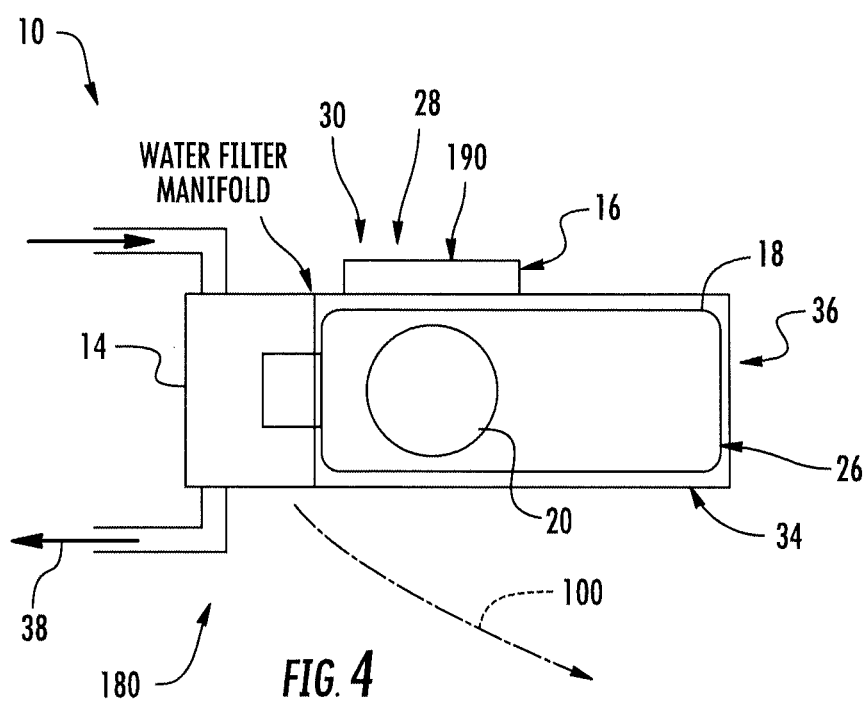
FIG. 4 is a schematic view of the water filter system of FIG. 2 illustrating the water filter during the notification state.

Before the subject device is described further, it is to be understood that the device is not limited to the particular embodiments of the device described below, as variations of the particular embodiments may be made and still fall within the scope of the appended claims. It is also to be understood that the terminology employed is for the purpose of describing particular embodiments or aspects of embodiments, and is not intended to be limiting. Instead, the scope of the claimed invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the device. The upper and lower limits of these smaller ranges may independently be included in the smaller ranges, and are also encompassed within the device, subject to any specifically excluded limit in the stated range. Where the stated range includes one or both of the limits, ranges excluding either or both of those included limits are also included in the device.

In this specification and the appended claims, the singular forms "a," "an" and "the" include plural reference unless the context clearly dictates otherwise.

Referring to the various aspects of the device as exemplified in FIGS. 1-6, reference numeral 10 generally refers to a water filter system for an appliance 12. The water filter system 10 can include a filter head assembly 14 disposed within a portion of the appliance 12 and a first appliance control unit 16, which is typically a microprocessor based control, with memory conducting arithmetic/logic operations and driving input and output devices to respond to a program's instructions. It directs the operation of the other appliance units by providing timing and operational control signals. Typically, the first appliance control unit is positioned within the appliance often proximate the filter head assembly 14. The water filter system 10 also includes a water filter 18 having a memory storage unit 20. The water filter 18 can be selectively placed in communication with the first appliance control unit 16 to define a filter use state 22. The filter use state 22 is further defined by a first potential fluid flow rate 24 through the water filter 18 as well as a predetermined useful lifetime fluid filtration amount 26 of water that passes through the water filter 18. The first potential fluid flow rate 24 defines a maximum flow rate of water that can be passed through the water filter 18 over a period of time, for example, at least during the pendency of the filter use state 22, typically where the filter is engaged with a refrigerator or other host appliance that dispenses, uses or dispenses and uses filtered water. The water to be filtered is typically water received by the appliance from a municipal water source or a well water source. Additionally, the predetermined lifetime fluid filtration amount 26 (See FIGS. 4-5) designates a total amount of water that can be passed through the water filter 18, typically at the first potential fluid flow rate 24 during an overall useful life period of the water filter 18 indicative of the filter use state 22.

The water filter system 10 can also include a data transfer mechanism 28 that is in signal communication with the memory storage unit 20 and the first appliance control unit 16. In this manner, the data transfer mechanism 28 provides for a first data-transfer protocol 30 between the memory storage unit 20 and the first appliance control unit 16 that is, typically, indicative of the filter use state 22. According to various aspects of the device, the data transfer mechanism 28 can also provide a second data-transfer protocol 32 between the memory storage unit 20 and the first appliance control unit 16 that can be activated when an actual fluid filtration amount 34 of the water filter 18 reaches the predetermined lifetime fluid filtration amount 26. It is contemplated that the second data transfer protocol 32 can be indicative of the notification state 36. Once the water filter 18 reaches the notification state 36, the water filter 18 may optionally change the water flow rate dispensed to the user, typically by slowing the rate of unfiltered water flowing through the water filter 18. When this is done, water flows at a second potential fluid flow rate 38. The second potential fluid flow rate 38, according to the various embodiments, may be less than the first potential fluid flow rate 24.

Referring again to FIGS. 1-5, it is contemplated that the data transfer mechanism 28 can include the memory storage unit 20 and the first appliance control unit 16 in communication with one another. The two components may be physically engaged or connected. It is also contemplated, as specifically disclosed herein, that the components can be engaged and free of physical contact with one another when the water filter 18 is in the filter use state 22. Accordingly, wireless communication between the memory storage unit 20 and the first appliance control unit 16 may be achieved through the use of various wireless communication methods. These wireless communication methods can include, but are not limited to, radio frequency identification (RFID), Wi-Fi, Bluetooth, near field communication (NFC), combinations thereof, and other similar wireless communication methods. As mentioned previously, it is also contemplated that an at least partial physical attachment communication between the memory storage unit 20 of the water filter 18 and the first appliance control unit 16 can be implemented. Communication between the memory storage unit 20 and at least one appliance control unit, or a plurality of control units, typically the first appliance control unit 16, occurs when the water filter 18 is in the filter use state 22. Such physical and/or wireless connection can implement any one of various communication signals, tags or other network communications between the memory storage unit 20 and the first appliance control unit 16. It is also contemplated that the overall data transfer mechanism 28 can include both wireless and physically connected portions between the memory storage unit 20 and the first appliance control unit 16 when the water filter 18 is in the filter use state 22.

Referring again to FIGS. 1-7, the data transfer mechanism 28 defined between the memory storage unit 20 and the first appliance control unit 16 could be used to transfer various authentication tags as well as status data related to the use of the water filter 18 before, during and after the filter use state 22. It is contemplated that the authentication tags can include various protocols that can include, but are not limited to, an initial start-up protocol 50, the first data-transfer protocol, the second or a subsequent data-transfer protocol, a non-authentication protocol 52, and other various protocols that will be described more fully below.

According to the various embodiments, as exemplified in FIGS. 1-7, the initial start-up protocol 50 can be a set of encrypted instructions saved within the memory storage unit 20 of the water filter 18. These encrypted instructions that define the initial start-up protocol 50 can be saved within the memory storage unit 20 during the process of manufacturing the water filter 18. The initial start-up protocol 50 is configured to be communicated to an appropriate first appliance control unit 16 when the water filter 18 is first installed into a first appliance 60. The initial start-up protocol 50 communicates an authentication signal 62 to the first appliance control unit 16, where the first appliance control unit 16 decrypts the encrypted signal and compares the authentication signal 62 against an authentication identifier 64 saved within the first appliance control unit 16. It is contemplated that the authentication identifier 64 disposed within the first appliance control unit 16 can also be encrypted. Accordingly, the authentication signal 62 provided by the initial start-up protocol 50 and the authentication identifier 64 disposed within the first appliance control unit 16 must include the encryption code such that the information can be exchanged according to a "hand shake" during the transfer of the initial start-up protocol 50 between the memory storage unit 20 to the first appliance control unit 16.

Once the authentication signal 62 and the authentication identifier 64 are decrypted, the authentication signal 62 and the authentication identifier 64 are compared, typically within and/or by the appliance control unit 16, in order to authenticate the water filter 18 as a licensed and/or compatible water filter 18 for use in connection with the appliance 12 that the water filter 18 is engaged with. In order to authenticate the water filter 18, various information exchanged between the memory storage unit 20 and the first appliance control unit 16 must match in order for the water filter 18 to be authenticated to initiate the filter use state 22 and the first data-transfer protocol. Such information can include, but is not limited to, one or a plurality of the following: a universal identifier containing a manufacturer ID, a non-stop forwarding (NSF) system certification number that can be unique to a particular manufacturer for a given water filter 18 and appliance 12 combination, the model of a particular water filter 18, the serial number of a particular water filter 18, the model of an appliance 12, the serial number of an appliance 12, and the various model number and serial number information written upon an authentication memory for purposes of "hand shake" communications between the memory storage unit 20 and the first appliance control unit 16.

According to various embodiments, as exemplified in FIGS. 1-11, various software packet coding can be transferred between the first appliance control unit 16 and the memory storage unit 20 to activate a second on-going authentication process. In this manner, the first data-transfer protocol, an authentication state for the water filter 18, a read-write counter disposed within the first appliance control unit 16 and/or the memory storage unit 20, combinations of the above, and/or other similar authentication elements can be electronically encrypted or otherwise encoded and used as part of the water filter authentication process to prevent unauthorized access to data stored on and communicated between the memory storage unit 20 and the first appliance control unit 16. It is also contemplated that various status information regarding the water filter system 10 can be transferred between the memory storage unit 20 and the first appliance control unit 16. Such status information can include, but is not limited to, fluid flow rates through the water filter 18, the amount of fluid passed through the water filter 18, the volume of water passing through the water filter 18, end-of-life data, water filter expiration information, and other similar status information.

Referring again to FIGS. 1-7, it is contemplated that the initial start-up protocol 50 saved within the memory storage unit 20 and/or the first appliance control unit 16 can be operated only once during the life cycle of the water filter 18 at the initial installation of the water filter 18 into an appropriate first appliance 60. Accordingly, once the initial start-up protocol 50 is operated to completion and the water filter 18 is authenticated to initiate the first data-transfer protocol for operating the data transfer mechanism 28 defined between the memory storage unit 20 and the first appliance control unit 16, the initial start-up protocol 50 can be overwritten. Accordingly, typically, the initial start-up protocol 50 cannot be run again when the water filter 18 is disposed within a second appliance 90. Accordingly, the overwriting of the initial start-up protocol 50 can prevent use of a single filter within multiple appliances 12, where a filter may be attempted to be reused beyond the useful life of the water filter 18. It is contemplated that a recycling processes 148 can be undertaken to provide for proper and authorized reuse of a water filter 18. Such recycling processes 148 will be described more fully below.

Referring again to FIGS. 1-7, the use of the initial start-up protocol 50 can also be implemented to prevent use of nonconforming water filters 80 within a particular appliance 12. As discussed above, the initial start-up protocol 50 can include, but is not limited to, an initial authentication "hand shake" that typically uses a combination of unique and proprietary encrypted passwords and/or proprietary microchip ID numbers. It is also contemplated that the initial start-up protocol 50 can implement a secondary "hand shake" between the first appliance control unit 16 and the memory storage unit 20 of the water filter 18 that also uses proprietary and encrypted certification numbers, encrypted proprietary, symmetrical or asymmetrical memory; security micro-control units; rolling serial numbers of the various matching water filters 18; combinations thereof; and other security measures. It is further contemplated that the initial start-up protocol 50 can result in exchange of filter usage data as well as appliance 12 status data between the memory storage unit 20 and the first appliance control unit 16. While this typically occurs at the startup for authentication, communication between the filter and the device that is reading the filter's tag (appliance or mobile device typically as will be described more below) may occur near the end of the filter's life based on estimated life, which is derived from usage time or totaled flow count. It may also occur periodically based on usage count or calendar date or externally sent subscription "ping" from a remote server(s), which would typically be owned or controlled by the manufacturer of the appliance or their representative. The information might also be read based on the occurrence of an event such as a power outage or upon filter removal and reinsertion. Finally, it is also contemplated that communication between the reading device and the water filter may be based upon a sensed event such as a change in water pressure, flow rate, temperature of water or ambient air or within the appliance, contaminant content within the untreated water to be treated, or a communication about water quality (a water quality alert) issued by a governmental authority, which would typically be a local utility or state or federal agency.

According to the various embodiments, once the initial start-up protocol 50 is complete and the water filter 18 is authenticated for use within the first appliance 60, the first data transfer protocol 30 can also include the use of various encryption technology for preventing unauthorized access to the authentication tags utilized during operation of the first data transfer protocol 30. It is contemplated that through the use of these encryption and authentication mechanisms, the ability of an unauthorized user to decipher the various encryption and authentication tags can be made more difficult, thereby preventing or deterring use of nonconforming water filters 80, which may not function as envisioned by the appliance 12 maker or may damage the appliance 12 from being used within various appliances 12.

Communication between the water filter and the appliance or another device, including a mobile computing device, may typically occur in one of two ways. First, the appliance may have a built in or be connected to a wireless computer network via a Wi-Fi connection or other wireless connection or via a wired connection such that it has the capability of communicating with the Internet or an individual remote server or set of servers via a global communication network of computer servers. in this manner, the water filter may prompt communication with the user via the network to a user's computing device or mobile computing device causing information to be displayed to the user via a native mobile software application or via a website that displays information received from the refrigerator. Alternatively, the manufacturer or other provider may send a signal to the appliance and thereby to the water filter and receive information from the appliance about the filter use life and other information. Typically this would only be done after receiving authorization from the user to do so such as in a user agreement via a mobile application or via another authorization method. Essentially, such a system would allow the refrigerator to communicate with the user at predetermined intervals or only when the filter is nearing the end of its useful life and/or at the end of its useful life. The notifications could be based on water quality or another event driven scenario that would potentially be measured by the refrigerator, the filter, or an outside data source from the individual users such as news and public utility warnings that might occur in a given geographic location or within a predetermined distance of the user/refrigerator. The other data could be water quality data received from testing done on other filters used in other appliances near or within a predetermined distance of the user's appliance as discussed herein. The filter and appliance communication could also cause the mobile application to display various notifications to the user via the mobile computer without the mobile application being open through notifications and other warnings. The notifications may further be communicated from a mobile application or via another route to a second mobile computing device or multiple other fixed or mobile computing devices such as a networked watch device configured to be in wireless communication with the device or the network directly via a wireless technology for exchanging data over, short distances from fixed and mobile devices, most typically via a near field communication (NFC) specification, and building personal area networks (PANs), or other wireless communication method. The NFC tag on the filter typically combines an NFC Radio and an MCU (microcontrol unit) on a single board to provide the NFC physical interface, The NFC tag communicates wirelessly with the NFC Module of the appliance. The NFC Module connects to Appliance communications/power bus (WIN) to communicate to the appliance's Appliance Control Unit (ACU)and Human Machine Interface (HMI). The Water Filter NFC tag Antenna will generally be sized to match the NFC Module Printed Circuit Board Antenna −25.91 mm×43 mm and provide a read range of at least 20 mm. The NFC TAG will typically include some or all of the following information: model number; serial number; filter creation date; filter manufacturer and/or supplier; filter actions including prohibit filter reset and modification of the flow rate; time limit of use of the filter; water volume limit of use of the filter; an installation date of when the filter was first installed into an appliance; a timer count that tracks time increments, typically ten minute increments; the water volume used; the time percentage used; and the volume percentage use, The base time for all time calculations is typically seconds such that a 6 month time period is 15,724,800 seconds (182 days×24 hr/day×60 min/hr×60 sec/min), for example, but could conceivably be any time increment, The NFC TAG will also have a shelf life of at least 10 years of life and an operational life of at least about 2 years.

A second manner in which the filter may communicate is generally centered around ways the filter can communicate information to the user when the refrigerator itself does not have a wired or wireless connection to a network or even if the refrigerator does have a connection as described above. This further communication functionality allows the water filters incorporating an RFID communication tag or other communication tag having the functionalities described herein to provide the same information and functionality to users of appliances without a networked connection. Many refrigerators may not have a network connection and a RFID or other communication tag reader incorporated within the appliance. Basically, the systems of the present disclosure will work with a networked appliance but also will work with an external computing device, typically a mobile computing device such as a tablet computer or mobile cellular and Wi-Fi enabled phone, in particular, such devices that have an RFID reading device or other NFC (near field communication) reader. These devices may be placed within close proximity to the water filter's RFID chip, typically within about one inch or less and the device may read the information instead of or in addition to the appliance reader. The device of the user may then be used to communicate with the remote server(s); convey information about the filter to the user; and also to undertake the other actions and benefits of the systems described herein such as registration of the appliance, reordering of a replacement filter, and recycling and testing of used filters. The website and mobile application may also track the shipment of replacement filters with RFID capability. The systems may also track and convey untreated water quality that is treated by the filter over time based on historical testing done on the tested and optionally recycled water filters.

Figure 12:
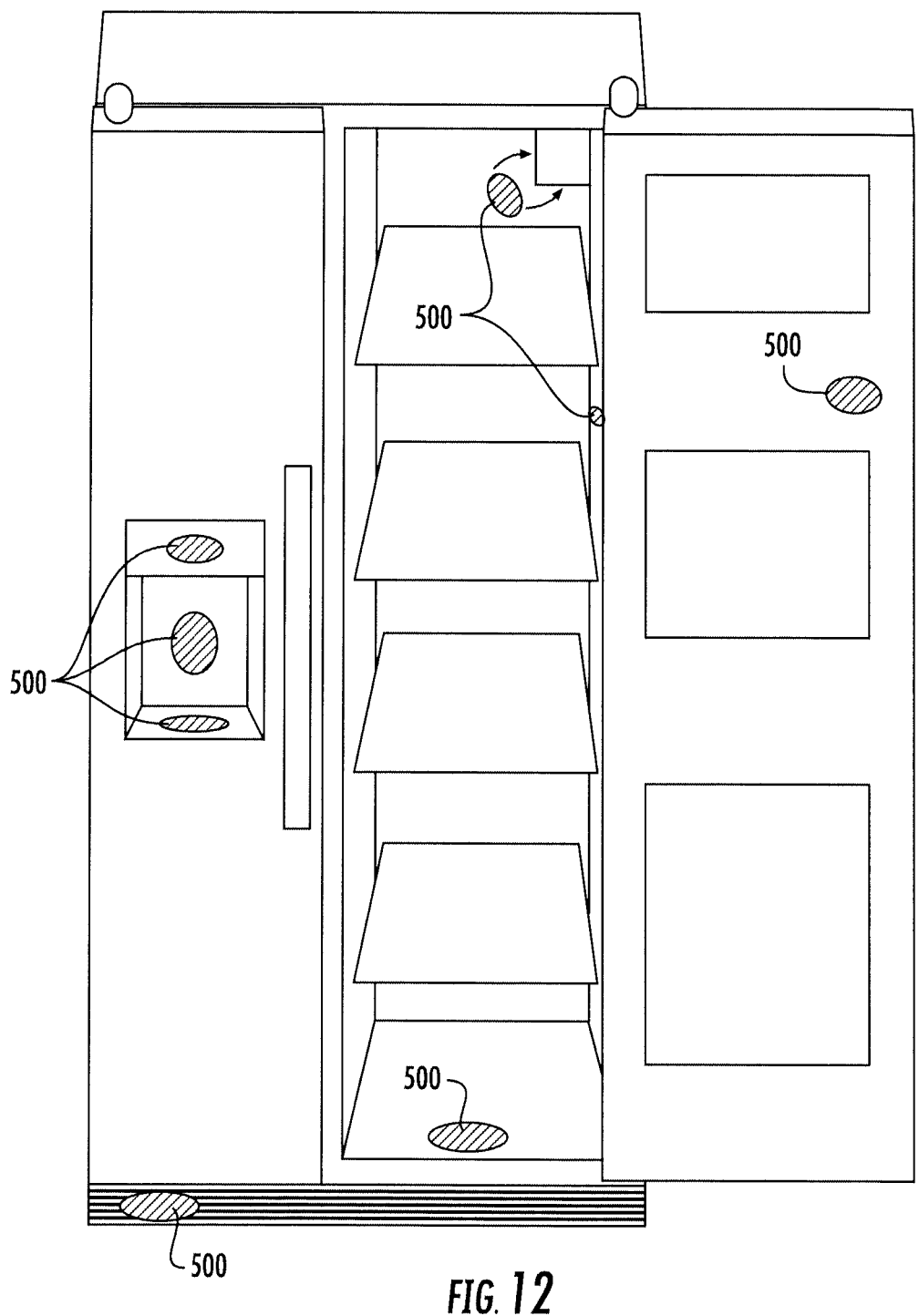
FIG. 12 is a front schematic view of an appliance according to the present disclosure showing various exemplary locations where a user's mobile computing device or other reader may be place to receive and transfer information about the water filter spaced within the appliance without the filter having to be removed from the appliance.

In addition to the water filters with the RFID tag on the water filter being able to be removed and read or read by another device when removed from engagement from the appliance, it is also possible that one may be able to read and communicate with the tag on the water filter without removing the filter from an appliance using a computing device that is not incorporated into the appliance such as a smartphone or smartwatch (iPhone®, iPad®, or Android® device). The user may place the user's device within a close proximity, a distance sufficiently close to read information on the device that is typically about one inch or less, by placing the device on a "landing zone." The landing zone 500 (see FIG. 12) is any region or location inside or outside of the appliance where a smart device may be positioned so as to improve potential for reading the filter RFID tag without interference of signal. The landing zone may be internal or external to any appliance structure. It may be located in the Human Machine interface, in a portion of the dispenser well or around the dispenser, in the lower grill, between the crisper drawers or on a top, side or bottom surface of a liner of the door or a main appliance body or other interior compartment interior access point where there compartment and door or main appliance body are not below freezing. Its main function is to indicate to a user where to place the device to read the information on the filter. The landing zone may be an easily accessible flat planar surface adjacent the filter RFID tag when the filter is engaged or it may have a specific geometry so as to cradle or physically dock the smart device. Conceivably, the refrigerator could contain or have a remote dock that contains a wired connection to the appliance to enable communication of information about the filter from the RFID tag on the filter through the microprocessor of the appliance and to the device via a wired connection such as through a Lightning® cable in the case of an Apple smart device or other similar tethering device that can convey data and also typically power to the mobile device. In this manner a user might charge the mobile device by docking the device with the appliance and also receive information from the appliance without the need for a wireless network connection. In such situations however, the appliance will typically need to have the RFID reader incorporated therein unless the dock is located proximate the filter such as being incorporated into the landing zone. It should be understood that the information displayed to the user may be either displayed through use of a separate mobile application that at least partially resides on the user's device or via a web site browser URL system that will display through a device's website browser information based on the URL request received by the user's device. Either method of displaying and conveying information may be used in the context of any of the aspects of the present disclosure such that where an application is referenced a URL web browser system may also be used and vice versa.

Figure 5:
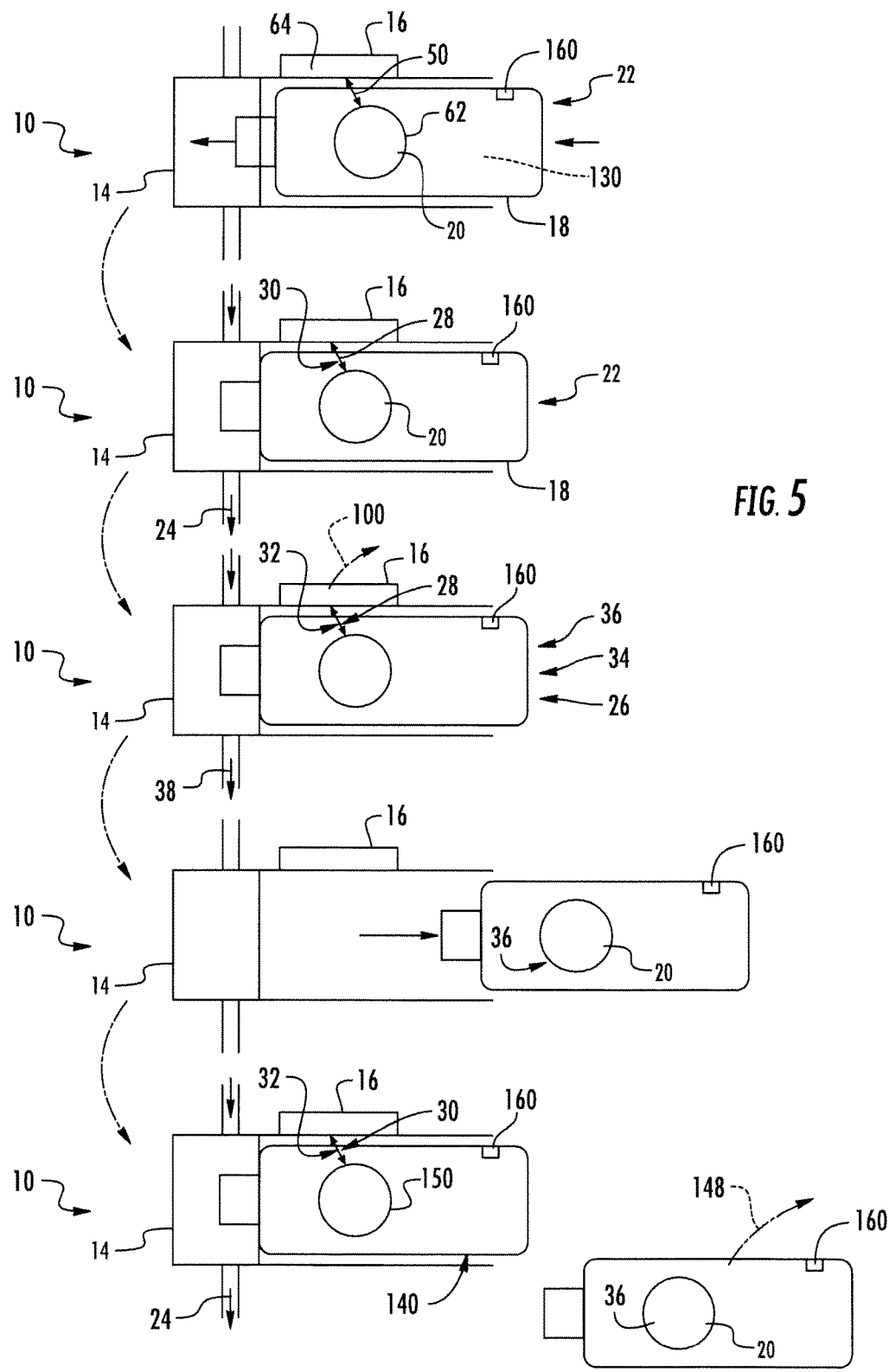
FIG. 5 is a schematic view of the water filter system illustrating an exemplary process for the water filter being removed and the replacement water filter being installed within the filter head assembly.
Figure 6:
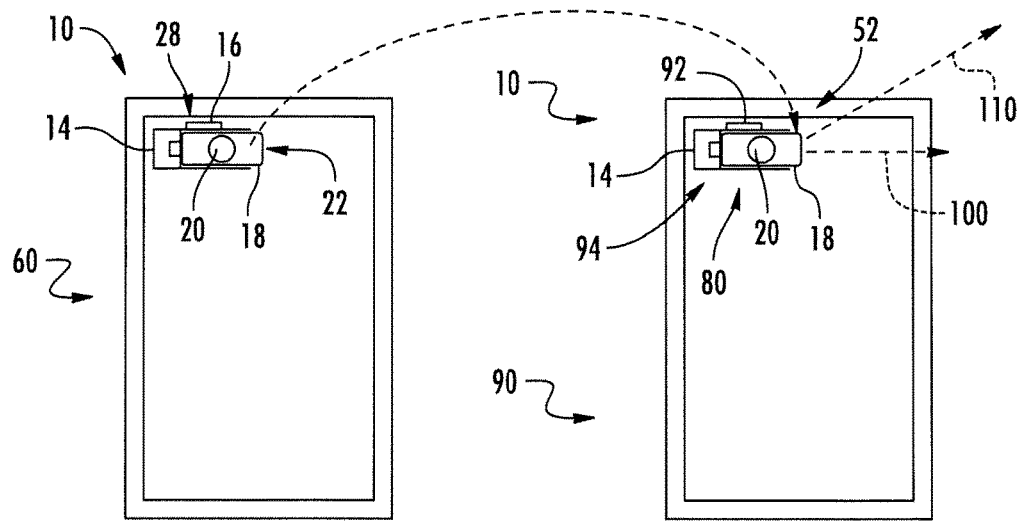
FIG. 6 is a schematic diagram illustrating first and second appliances, each incorporating an aspect of the water filter system and illustrating sequential installation of a water filter in each of the first and second appliances.
Figure 7:
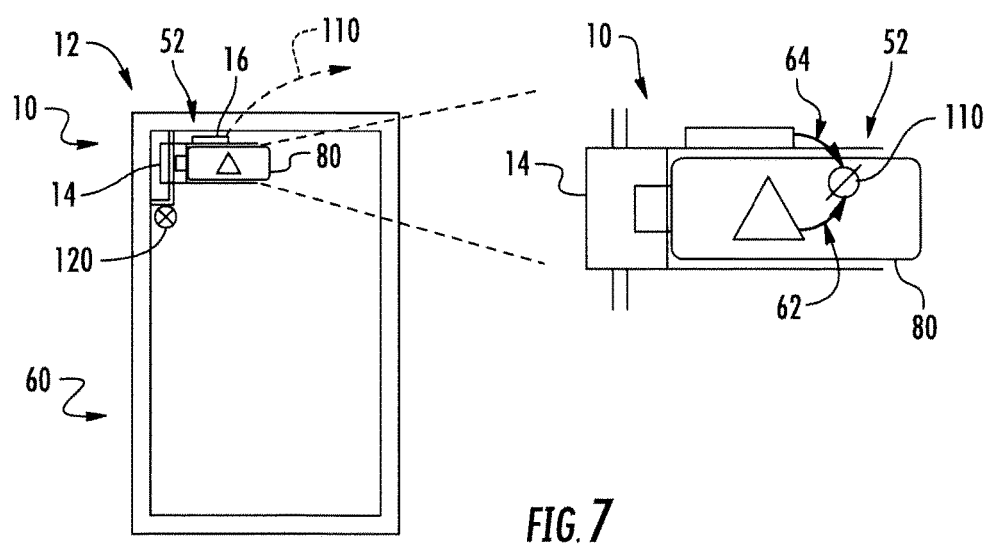
FIG. 7 is a schematic diagram illustrating a non-authentication state defined between a first appliance control unit and a non-conforming water filter.
Figure 8:
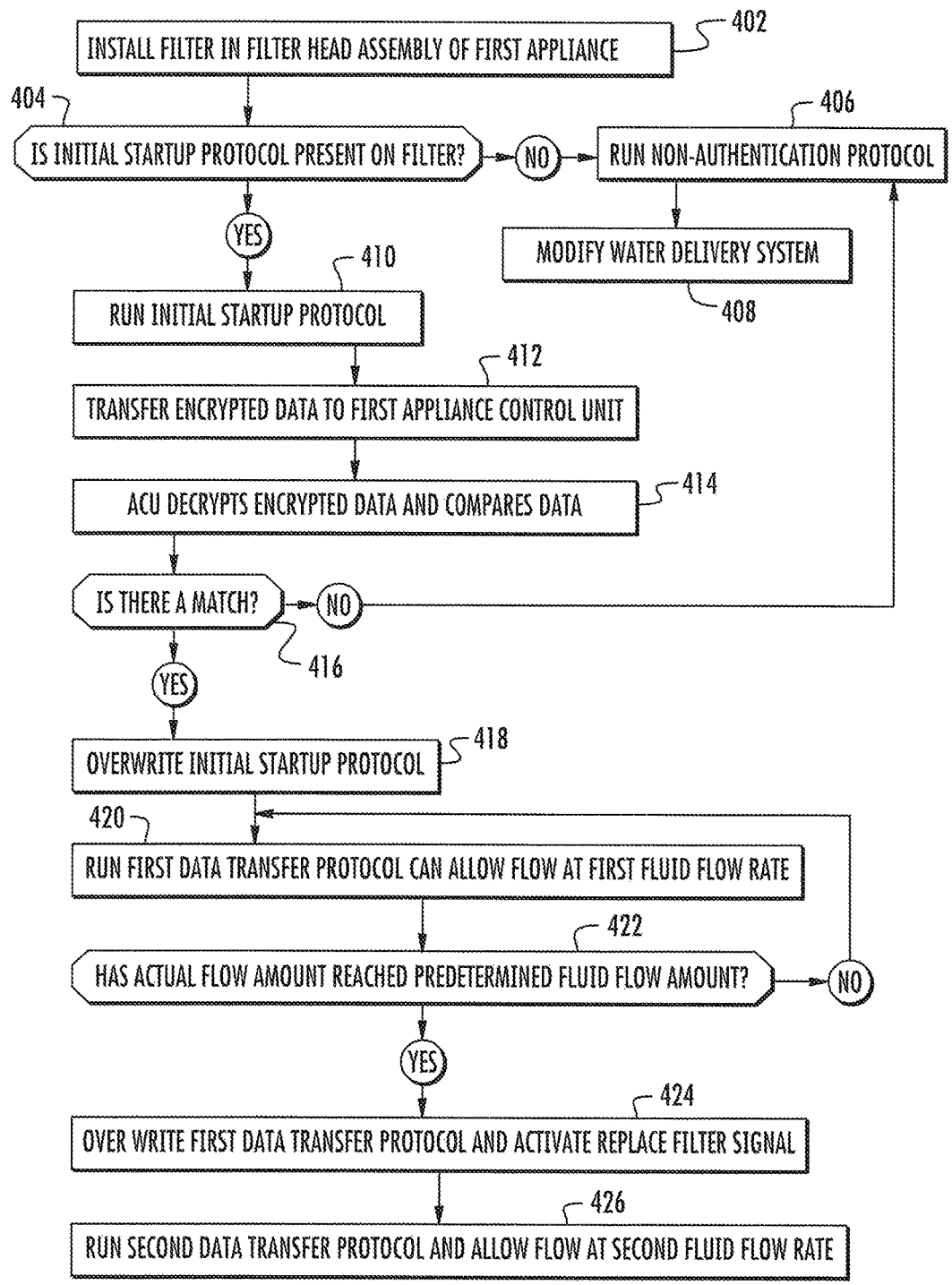
FIG. 8 is a schematic flow diagram illustrating a method for installing a water filter for an appliance incorporating an aspect of the water filter system.

Referring now to FIGS. 5 and 6, after a water filter 18 has been installed within a first appliance 60 and the initial start-up protocol 50 has been performed, and the water filter 18 authenticated, the water filter 18 can be designed such that the initial start-up protocol 50 cannot be run again. By way of example, and not limitation, the initial start-up protocol 50 can be overwritten, or computer code can be included to prevent a second operation of the initial start-up protocol 50. Accordingly, after the water filter 18 has been installed and authenticated within the first appliance 60, an attempt to install the same water filter 18 into a second appliance 90 can result in the operation of a non-authentication protocol 52, such that the water filter 18 cannot be authorized by the second appliance 90. In such a circumstance, the filter use state 22 cannot be activated and the first data-transfer protocol cannot be run within the second appliance 90.

According to various alternate embodiments, it is contemplated that the initial start-up protocol 50 will only be written over when the water filter 18 has substantially passed or passed its useful life and is disposed in the notification state 36. In such an embodiment, so long as the water filter 18 is in the filter use state 22, the water filter 18 can be used in other corresponding appliances 12 and the initial start-up protocol 50 is capable of being executed to authenticate the water filter 18 in each of the appliances 12. During the filter use state 22 of the water filter 18, status information regarding use of the water filter 18 may be continually recorded and updated within the memory storage unit 20 to continually define and redefine the current status information of the water filter 18. This current or "real time" status information is transferred to the corresponding first appliance control unit 16 of each appliance 12 with which the water filter 18 has been authorized to work. In addition to current or "real time" status information, history and use information through any portion or all of the useful life of the water filter 18 may be transferred. The water filter 18 may be disposed in the notification state 36 when substantially all or all of the useful life of the water filter 18 has passed, whether the water filter 18 has been used in a single appliance 12 or multiple appliances 18. Once the notification state 36 has been reached, it is contemplated that both the initial start-up protocol 50 and the first data transfer protocol 30 can be overwritten. Accordingly, once the water filter is in the notification state 36, the water filter 18 may not be installed within another appliance 12. Whether the water filter 18 is installed in a first appliance 60, a second appliance 90, or a subsequent appliance 12, the user is accurately informed when a water filter 18 is or has become expired regardless of whether the water filter 18 was used in one or more appliances 12 previously.

It is contemplated that the non-authentication protocol 52 can result in various modifications to the water filter system 10 and/or notifications to the user. Such modifications and notifications can include, but are not limited to, a diminished flow rate of fluid through the water filter 18, deactivation of the water system of the appliance 12 such that water cannot be delivered through the water filter 18, activation of a warning signal 100 associated with the appliance 12 alerting the user that the filter trying to be used is a non-conforming water filter 80, combinations thereof, and other similar identifiers, which may or may not be communicated to the user of the second appliance 90, but typically are communicated or are communicated with an appliance user. A nonconforming water filter 80 may be one that has an improper protocol, tag or other signal that does not match the information stored in the first appliance control unit 16. A nonconforming water filter 80 may also be a water filter that has no memory storage unit 20 or is otherwise unable to transfer data.

The use of the non-authentication protocol 52 can also be implemented to prevent unauthorized recycling of used water filters 18 that have been at least partially used in a first appliance 60, and can also prevent unauthorized counterfeiting of water filters 18 that may not conform to the requirements necessary for use in a particular appliance 12. Accordingly, the non-authentication protocol 52 can include a non-authentication signal 110 that is delivered from the memory storage unit 20 to the appliance control unit 16 of the second appliance 90. This non-authentication signal 110 can be implemented when the authentication identifier 64 disposed within the appliance control unit of the second appliance 90 either does not receive the authentication signal 62 or receives a non-authentication signal 110. As discussed above, when a water filter 18 has been previously used such that the initial start-up protocol 50 is overwritten, the authentication signal 62, according to the various embodiments, may not be sent, as the initial start-up protocol 50 for providing an authentication signal 62 may no longer be present within the memory storage unit 20.

Referring again to FIGS. 1-7, the first data transfer protocol 30 of the data transfer mechanism 28 of the first appliance 12 that is performed when the water filter 18 is engaged with the appliance 12 can operate until such time as the actual fluid filtration amount 34 of the water filter 18 reaches the predetermined lifetime fluid filtration amount 26 saved within a portion of the water filter system 10. At this point, the data transfer mechanism 28 can switch from the first data-transfer protocol to the second data-transfer protocol that is operated during the notification state 36 of the water filter 18. As discussed above, the notification state 36 of the water filter 18 is defined by the water filter 18 having filtered an amount of water equal to, or substantially equal to, the predetermined lifetime fluid filtration amount 26.

Additionally, due to the single-use nature of the initial start-up protocol 50, it is contemplated that this amount of water is filtered during use of the water filter 18 within only the first appliance 60. Once the second data-transfer protocol is initiated, the second data transfer protocol 32 can define various changes to the water filter system 10 and the first appliance 60 in general. Such changes can include, but are not limited to, activation of the second potential fluid flow rate 38, where the second potential fluid flow rate 38 can be less than the first potential fluid flow rate 24. This changed fluid flow or other communication to the user of the appliance 12 would indicate to the user that the water filter 18 has exceeded or is about to exceed its effective useful life.

By way of example, and not limitation, the second potential fluid flow rate 38 can be, at most, 0.5 times the first potential fluid flow rate 24. Alternatively, the second potential fluid flow rate 38 can be defined by a sequentially decreasing flow rate that generally decreases from the first potential fluid flow rate 24 and downward to a level that can be between 0.5 times the first potential fluid potential flow rate 24 to zero fluid flow through the water filter 18 and/or the fluid delivery system 122 of the appliance 12.

It is also contemplated that when the second data transfer protocol 32 is initiated, the second potential fluid flow rate 38 can be immediately changed to zero fluid flow through the water filter 18 and/or the fluid delivery system 122 of the appliance 12. This change in the potential fluid flow rate when the water filter 18 changes from the filter use state 22 to the notification state 36 can be performed by a mechanism disposed within the water filter 18, a mechanism disposed within the filter head assembly 14 of the appliance 12, a valve 120 disposed within the fluid delivery system 122 of the first appliance 60, combinations thereof, and other various mechanisms that can alter the amount of water delivered to and through the water filter 18 during the notification state 36 of the water filter 18 such that substantially all of all of the effective useful life of the water filter 18 has passed.

Referring again to FIGS. 1-7, once the water filter 18 is disposed within the notification state 36, the expired status of the water filter 18 being in the notification state 36 may be saved within the memory storage unit 20 of the water filter 18. Accordingly, subsequent use of the water filter 18 might be limited to the second potential fluid flow rate 38 defined by the notification state 36 of the water filter 18. According to the various embodiments, it is contemplated that once the notification state 36 of the water filter 18 is reached, such that substantially all or all of the effective useful life of the water filter 18 is passed, data related to the filter use state 22 can be overwritten, deleted, or otherwise prevented from being subsequently used. In this manner, once the water filter 18 reaches the notification state 36, only the second potential fluid flow rate 38 can be implemented during use of the water filter 18 in the first appliance 60 or any other conforming appliance 12. The use of the notification state 36 can prevent and/or deter use of the water filter 18 beyond the effective life of the filtration media 130 disposed within the water filter 18. After a certain amount of water has been delivered through the water filter 18 corresponding to the predetermined lifetime fluid filtration amount 26, it is possible that the filtration media 130 can be less effective such that the water filter 18 may be less able to remove various materials from water delivered through the water filter 18. Accordingly, the use of the notification state 36 and the second potential fluid flow rate 38 can communicate to the user that the filtration media 130 has reached or substantially reached its life cycle and should be replaced with a replacement water filter 140.

According to the various embodiments, once the water filter 18 has reached the notification state 36, and substantially all or all of the useful life of the water filter 18 has been reached or exceeded, it is contemplated that a recycling process 148 can be implemented to recondition the water filter 18 for authorized reuse in another appliance 12 such that the initial start-up protocol 50 can be executed after recycling. Such a recycling process 148 can include replacing the memory storage unit 20 along with the filtration media 130. The replacement memory storage unit 150 can include the data for initiating the initial start-up protocol 50 when the water filter 18 is installed within an appliance 12. It is also contemplated that the recycling process 148 can include reprogramming the memory storage unit 20 to erase all of the previously recorded status information and include data for initiating the initial start-up protocol 50. According to the various embodiments, the recycling process 148 can include a system for monitoring the number of times that a particular water filter 18 has been recycled. This system can also include the storage of data related to overall use of the water filter 18. It is contemplated that such overall use data can be sequestered from the appliance 12 and only utilized in the recycling process 148 to determine if recycling or disposal is appropriate. The overall use data can be stored in a separate memory unit 160 positioned within the water filter 18.

Referring again to FIGS. 1-7, the water filter system 10 can include a fluid filtration device 180 for the appliance 12, where the fluid filtration device 180 includes the water filter 18 having a memory storage unit 20 disposed thereon. As discussed above, the water filter 18 is configured to be placed in selective communication with the first appliance control unit 16 to define a unique filter identification tag 182 that can correspond to the first data transfer protocol 30. The unique filter identification tag 182 can define the first potential fluid flow rate 24 of the water filter system 10 for a first appliance 60. The fluid filtration device 180 can also include the data transfer mechanism 28 that is at least partially defined by the memory storage unit 20 being placed in communication with the first appliance control unit 16. In this manner, the data transfer mechanism 28, through cooperation of the memory storage unit 20 and the first appliance control unit 16, can define the unique filter identification tag 182. It is contemplated that the unique filter identification tag 182 is at least partially stored within the memory storage unit 20. After the unique filter identification tag 182 is defined, the memory storage unit 20 is subsequently unable to cooperatively define the unique filter identification tag 182 with a second appliance control unit 92 of a second appliance 90. Accordingly, cooperation of the memory storage unit 20 and the second appliance control unit 92 can define a generic filter identification tag 190, where the generic filter identification tag 190 is configured to define the second potential fluid flow rate 38 of a second water filter system 94 of the second appliance 90. As discussed above, the second potential fluid flow rate 38 is less than the first potential fluid flow rate 24. It is contemplated that the generic filter identification tag 190 can correspond to one or both of the non-authentication protocol 52 or the second data transfer protocol 32, depending upon the configuration of the memory storage unit 20 of the water filter 18 and/or the first and second appliance control units 16, 92.

Referring again to FIGS. 1-7, the memory storage unit 20 can define the predetermined lifetime fluid filtration amount 26 of untreated water that can be delivered through the water filter 18 to effectively form/yield treated water. It is contemplated that the unique filter identification tag 182 that corresponds to the first data transfer protocol 30 can be operative until the actual fluid filtration amount 34 of the water filter 18 reaches the predetermined lifetime fluid filtration amount 26 of the water filter 18. At this point, the memory storage unit 20 can cease to generate the unique filter identification tag 182, or the data related to the unique filter identification tag 182 can be overwritten. The memory storage unit 20 can then generate one or more of the generic filter identification tag 190, the non-authentication protocol 52, or the second data transfer protocol 32. Accordingly, when a user attempts to use the water filter 18 in the second appliance 90 and/or when the water filter 18 has exceeded its useful lifespan, the water filter system 10 is configured to change in some manner to communicate to the user that the water filter 18 is ready to be replaced with a new water filter 18 that can run the initial start-up protocol 50 and, subsequently, the first data transfer protocol 30. It is contemplated that the unique filter identification tag 182 can include one or both of the initial start-up protocol 50 and the first data transfer protocol 30.

Referring again to FIGS. 1-7, it is contemplated that the filter use state 22 of the water filter 18 can be defined by the memory storage unit 20 of the water filter 18 being spaced approximately one inch, or less, from the first appliance control unit 16, such distances between the memory storage unit 20 and the first appliance control unit 16 can be one-half inch, one-quarter inch, or other similar distance. The close positioning between the memory storage unit 20 and the first appliance control unit 16 can be used where the data transfer mechanism 28 is a radio frequency identification (RFID) mechanism. In embodiments where an RFID mechanism 200 is implemented, an RFID microchip can be disposed on a water filter 18 and a radio circuit module 204 can be disposed on the first appliance control unit 16 or otherwise within the appliance 12 at a location capable of reading a signal. Additionally or alternatively, a mobile computing device may be used as a radio circuit module/RFID reader as will be discussed further below. The RFID mechanism 200 can implement the use of electromagnetic fields to transfer data for purposes of automatically identifying and tracking various tags associated with the memory storage unit 20 and the first appliance control unit 16. These tags, which can correspond to the various protocols and signals described above, can deliver electronically stored information between the memory storage unit 20 and the first appliance control unit 16 or potentially any other RFID reader. Also as discussed above, this information can be encrypted to prevent unauthorized access.

In addition to the delivery of information, it is contemplated that the RFID microchip disposed on the water filter 18 can be powered by the radio energy transmitted by the radio circuit module 204 at least when the water filter 18 is in the filter use state 22. Accordingly, the various tags, signals and protocols can be powered through the use of electromagnetic induction generated from the magnetic fields used to transfer the data via the RFID mechanism 200. It is also contemplated that the memory storage unit 20 and the first appliance control unit 16 can include a dedicated power source disposed within the water filter 18 and the filter head assembly 14, respectively. Additionally, it is contemplated that the RFID microchip 202 can be disposed within a portion of the water filter 18. In such an embodiment, the RFID microchip 202 can be a printed microchip disposed on an exterior surface of the water filter 18, on an interior surface of the water filter 18, such as within an inner cavity of the water filter 18, or some other surface of the water filter 18. It is also contemplated that the RFID microchip 202 can be embedded within a portion of the water filter 18, such as within one of the walls of the water filter 18 or proximate the filtration media 130 of the water filter 18. The microchip 202 may be molded into a portion of the filter housing, for example. It is contemplated that the RFID microchip 202 may be embedded in a tamper-evident location such that if the RFID microchip 202 is accessed, or attempted to be accessed, by a user, the water filter 18 will be not engage the appliance 12 properly or, at a minimum, the tampering would be readily visible to a subsequent user.

According to the various embodiments, it is contemplated that alternate data transfer mechanisms 28 can be implemented within a water filter system 10. Such data transfer mechanisms 28 can include an antenna disposed proximate a portion of the memory storage device, such as near a microchip of the water filter 18. In such an embodiment, the first appliance control unit 16 can be positioned proximate a main control housing of the first appliance 60. It is contemplated that the main control housing can be positioned distal from the water filter 18, such as at the main control unit controlling the various mechanical and electrical functions of the entire appliance 12. Accordingly, the antenna can be in communication with the main control housing when the water filter 18 is in the filter use state, even though the water filter 18 may be positioned on a distal portion of the appliance 12.

According to the various embodiments, the disclosure includes providing: the data transfer mechanism 28, the memory storage unit 20 and the first appliance control unit 16; and/or the memory storage unit 20 and a user's mobile computing device that can cooperate to deliver information to a manufacturer concerning status information of the appliance 12 and/or the water filter system 10. In such an embodiment, where the user of the appliance 12 authorizes the delivery of such information, the manufacturer can be notified when a nonconforming water filter 80, such as a counterfeit water filter or a water filter 18 that is in the notification state 36 (has substantially or completely expired), is attempted to be used within the appliance 12. It is possible for the manufacturer to then contact the user to inform them of how to obtain a conforming water filter 18 for use in the appliance 12. Such communications can be delivered to the manufacturer through a Wi-Fi communications network, other wireless communications network, a wired communications network, combinations thereof, or other similar communications network. Such data transfer to the manufacturer can also alert the manufacturer to any unauthorized attempts to access encrypted information contained within the water filter 18 and/or the appliance 12. Such communication may also be made through a mobile application running on the user's mobile computing device such as a smartphone (typically with cellular and/or Wi-Fi capability), tablet or laptop computer systems or through a website (URL) enable system accessed by the user via an Internet browser. Traditional desktop computer systems may also be used, but would be less likely to be used to communicate such information. The mobile computing devices, when used, will typically have a RFID reader mechanism incorporated therein.

According to the various embodiments, it is contemplated that the data transfer mechanism 28 can be in signal communication with a portable computing device for communicating data from the data transfer mechanism to a separate location. Such a portable computing device can include smart phones, tablets, personal computers, wearable computing devices, or other similar devices having data processing and communication capability.

Referring again to FIGS. 1-7, the use of the initial start-up protocol 50 can also be implemented to provide an automatic exchange program for consumers. A consumer concerned about the quality of his/her water will typically send water samples into independent water testing facilities. This often requires the consumer to purchase a sampling kit at a local store, obtain a water sample, fill out name and address information, mail the sample to the testing facility, and wait for the test results in the mail. This process is burdensome and time consuming. Further, the results are not usually digitally available and do not provide comparative test results from previous testings, nor do they provide recommendations as to how to filter the water more effectively. As already described above, the initial start-up protocol 50 can include, but is not limited to, an initial authentication "hand shake" that typically uses a combination of unique and proprietary encrypted passwords and/or proprietary microchip ID numbers. It is further contemplated that the initial start-up protocol 50 can result in exchange of filter data and a consumer's phone or other mobile device. The consumer or user may elect to enroll in the automatic exchange program and elect to have the filter analyzed or not upon expiration of the filter's useful life. If enrolled and upon the expiration of the useful life of the water filter 18, the consumer will use the mobile phone (or other device) NFC reader to read the water filter 18. The user may be taken to a particular display of information in a mobile application or be taken to a web site. At either type of data entry point, in order to enroll in the automatic exchange program either with or without analysis, the consumer typically registers their personal identifying information (i.e. name, address, telephone number)(with the appliance model and number automatically filled in) whereby the consumer can sign up for an automatic filter replenishment with or without analysis. If the user elects to have an analysis of the filter's use done, the consumer will receive a return post paid container in the mail to the registered address for the user that was provided, typically via an internet website, via a computer network, or via a mobile application similarly in communication with a computer network. Typically, the computer network is a remote computer network connected to the Internet. The consumer can then return the used water filter to the manufacturer for testing or to a testing facility, which is typically a testing facility designated by the manufacturer. Once the water filter has been shipped to the testing site and received by the testing facility, the filter is placed into a water test machine that will read the data from the NFC tag and the data in the memory storage unit 20 of the water filter 18, create a water report, and send the results to the user's account where the report and information may be accessed by the consumer via the web site or the mobile application. Of course, the consumer may have the filter automatic replaced without any testing done to the filter.

The data from the water filter NFC tag and/or memory storage unit can be used by the water testing facility to determine, for example, types of water that require different types of filtering and thereby offer or recommend to the consumer water filters that are more appropriate for the type of water they have in their system(s) in their specific geographic location. The data from multiple consumers may also be aggregated and sorted by type of appliance, geographic location (zip code, street address, city, state/province, etc. and recommendations made to future first time filter users based on data from other nearby users. This might typically be done: at the time the appliance is registered through the website of the manufacturer of an appliance; at the time and location of purchase of an appliance; at the time the appliance is initially registered by the consumer through use of the mobile application or at a time after registration of the appliance, but before any filter that has been used in the consumer's appliance is actually tested; at any time the consumer desires, a filter fitting the generally filtering needs of the geographic area of future use may be ordered by the user so long as enough other consumers in the general geographic area have had their filters tested and analyzed.

Referring now to FIGS. 1-9, having described the various aspects of the water filter system 10 that incorporates the data transfer mechanism 28 defined by the memory storage unit 20 of the water filter 18 and the first appliance control unit 16 of a first appliance 60, a method is also disclosed for installing and replacing a water filter 18 for an appliance 12. Such a method 400 can include a step 402 of providing a water filter 18 having a memory storage unit 20. As discussed above, the water filter 18 can be configured for selective communication with a first appliance control unit 16 to define the filter use state 22. The filter use state 22 can be further defined by a first potential fluid flow rate 24 through the water filter 18 and the predetermined lifetime fluid filtration amount 26. According to step 404 of the method 400, the water filter 18 can be installed within the filter head assembly 14 of the appliance 12 to be in communication with the first appliance control unit 16.

Once the water filter 18 is installed, it is determined whether the initial startup protocol 50 is present on the water filter 18 (step 404). Where the initial startup protocol 50 is not present, a non-authentication protocol 52 is run (step 406) and the fluid delivery system 122 is modified (step 408) in some manner to slow or stop the flow of water and/or to activate a warning signal 100. The non-authentication protocol 52 may be activated where the initial start-up protocol 50 has previously been overwritten through previous use of the water filter 18, or where the water filter 18 is in a non-conforming water filter 80.

If the initial start-up protocol 50 is present, it is run (step 410) and the first appliance control unit 16 receives and decrypts the data and compares the data for authorization purposes (steps 412-416). If there is no match, the non-authentication protocol 52 is run. If a match is found, the initial start-up protocol 50 is overwritten (step 418) and the first data transfer protocol 30 is run (step 420). This engagement places the memory storage unit 20 in communication with the first appliance control unit 16, such that the data transfer mechanism 28 can be defined by communication between the memory storage unit 20 and the first appliance control unit 16. In this manner, the data transfer mechanism 28 can define the first data transfer protocol 30 that further defines the filter use state.

Once installed, fluid is selectively provided through the water filter 18 at the first potential fluid flow rate 24. This first potential fluid flow rate 24 continues until the actual fluid filtration amount 34 of the water filter 18 reaches the predetermined lifetime fluid filtration amount 26 (step 422). At this point, the first data transfer protocol 30 is overwritten (step 424) and the second data transfer protocol 32 is defined through the data transfer mechanism 28 (step 426). Accordingly, the second data transfer protocol 32 defines the notification state 36. As discussed previously, the second potential fluid flow rate 38 can be less than the first potential fluid flow rate 24. When the notification state 36 is defined, the user can be notified that the water filter 18 is ready to be replaced. At this time, the user can remove the water filter 18 from communication with the first appliance control unit 16.

After being removed from the first appliance control unit 16, the memory storage unit 20 maintains the second data transfer protocol 32 and is free of subsequently defining the first data transfer protocol 30. As discussed previously, it is contemplated that the second data transfer protocol 32 can overwrite the first data transfer protocol 30 such that the first data transfer protocol 30 cannot be subsequently reinitiated when disposed within the same appliance 12 or a different appliance 12.

Figure 9:
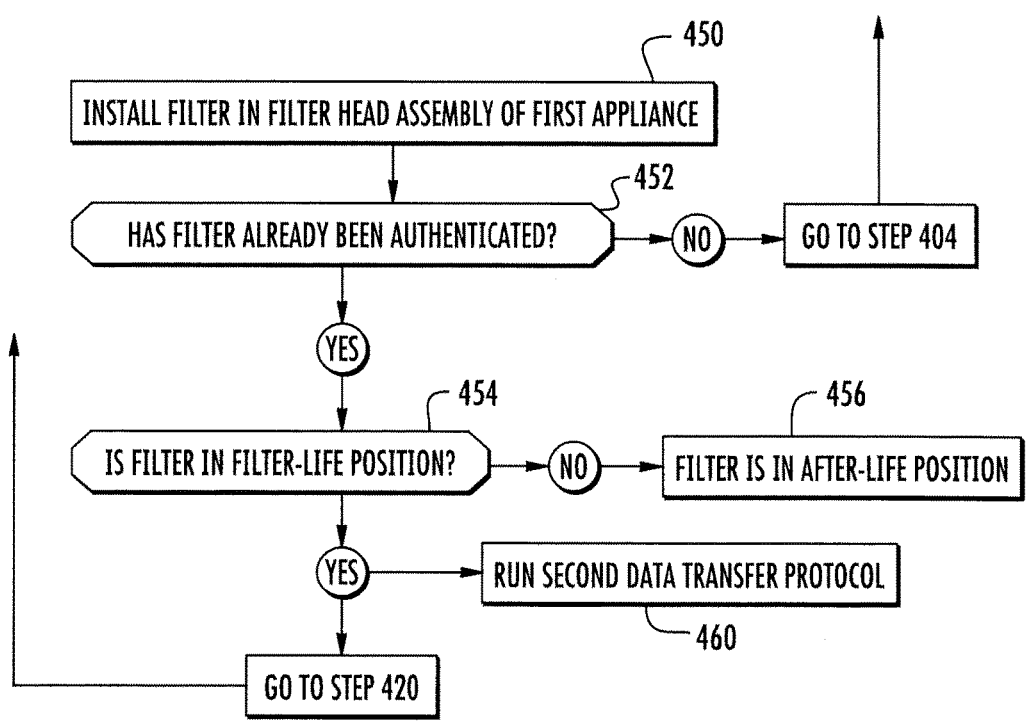
FIG. 9 is a schematic flow diagram illustrating a method for verifying the state of a water filter installed within a water filter system.
Figure 10:
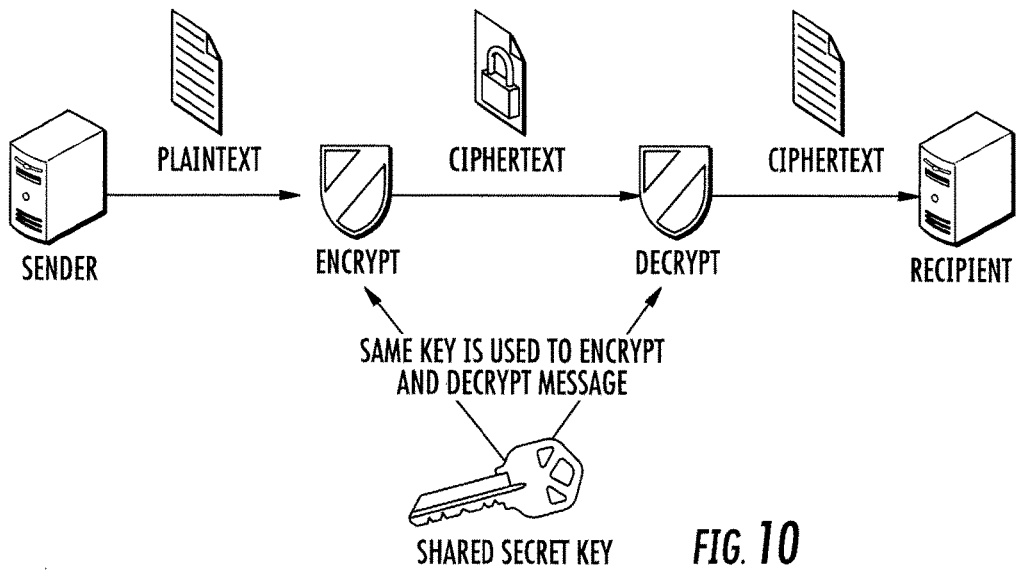
FIG. 10 is a schematic diagram illustrating an exemplary encryption/decryption system for the water filter system.
Figure 11:
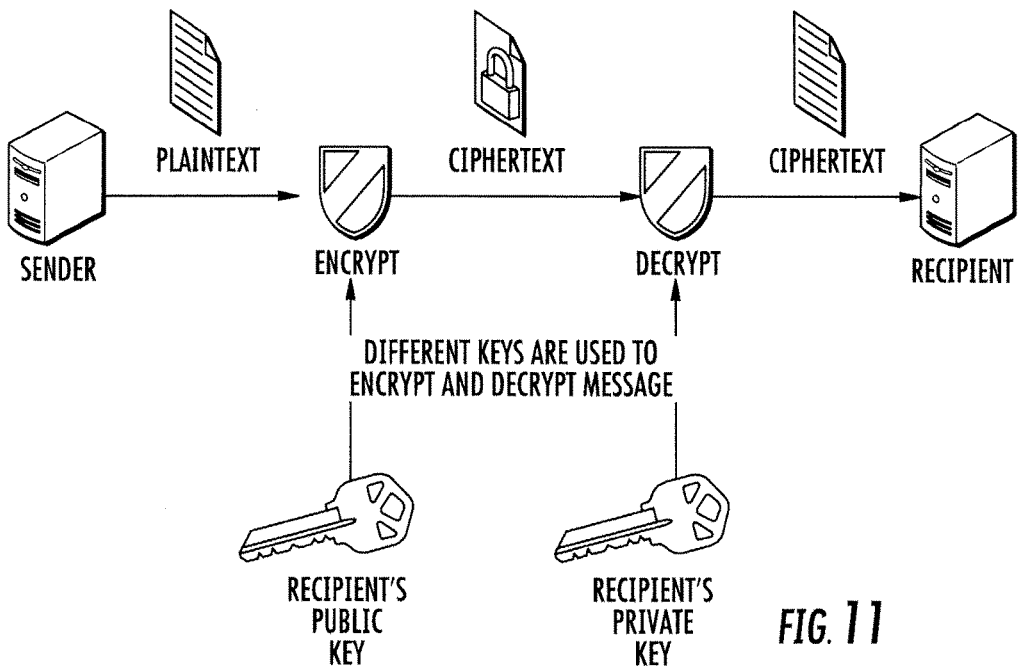
FIG. 11 is a schematic diagram illustrating an alternate aspect of an exemplary encryption/decryption system for the water filter system.

According to another aspect of method 400, as exemplified in FIG. 9, a replacement water filter 140 can be provided having a replacement memory storage unit 160 or a reprogrammed memory storage unit 20. It is contemplated that the replacement water filter 140 is configured for selective communication with the first appliance control unit 16 to define the filter use state 22 as to the first appliance control unit 16 and the replacement memory storage unit 160. The replacement water filter 140 can then be installed (step 450). Once installed, the status of the water filter 18 is determined to ascertain whether the appliance 12 has already authorized the water filter 18 (step 402). If already authenticated, the water filter 18 is not a replacement water filter 140 and it is determined whether the water filter 18 is in the filter use state 22 (step 454) or the notification state 36 (step 456). If in the notification state 36, the second data transfer protocol 32 is continued (step 460) and the second potential fluid flow rate 38 is used. If still in the filter use state 22, the first data transfer protocol 30 is used to deliver water at the first potential fluid flow rate 24 (step 462). The replacement water filter 140 can be placed in communication with the first appliance control unit 16 to place the replacement memory storage unit 160 in communication with the first appliance control unit 16. In this manner, the data transfer mechanism 28 is again defined by communication between the replacement memory storage unit 160 and the first appliance control unit 16. It is further contemplated that the data transfer mechanism 28 can be defined by the first data transfer protocol 30 that further defines the filter use state 22. Once the replacement water filter 140 is installed, fluid is selectively provided through the replacement water filter 140 at the first potential fluid flow rate 24 until such time as the actual fluid filtration amount 34 of the replacement water filter 140 reaches the predetermined lifetime fluid filtration amount 26. At this time, the various steps of replacing the water filter 18 can be repeated continuously through the life of the appliance 12.

It is important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method comprising the steps of:
    testing a water quality of water provided by a plurality of used water filters from a given geographic area;
    providing a geographically tailored water filter designed to filter water received by a refrigeration appliance of a water filter user from a water source within the given geographic area to the water filter user located in the given geographic area;
    installing the geographically tailored water filter into a water filter head assembly within the refrigeration appliance of the user;
    filtering water using the installed geographically tailored water filter until the installed geographically tailored water filter is a used water filter;
    delivering a replacement water filter to the water filter user; and
    wherein the refrigeration appliance of the user is connected with a water filter provider using a wired connection or a wireless connection to connect the refrigeration appliance with a server via a global communication network of computer servers.

2. The method of claim 1 further comprising the step of:
    enrolling the water filter user in an appliance water filter exchange program using a website or mobile device application whereby the water filter user elects to participate in the appliance water filter exchange program and provides water filter user identifying information; and wherein the refrigeration appliance of the user further comprises a water dispenser connected to the filter head assembly via a water conduit that delivers filtered water to the user of the refrigeration appliance.

3. The method of claim 1 further comprising the steps of:
    the water filter user receiving a container for the used water filter;
    delivering the used water filter to a testing facility;
    testing the plurality of used water filters at the testing facility; and
    shipping the replacement water filter to the water filter user.

4. The method of claim 1, wherein the step of delivering a replacement water filter to the water filter user comprises delivering a geographically tailored water filter that is designed to filter water within the geographic area when installed and used by the water filter user based upon a water quality of water received from a municipal source or a well water source within the given geographic area of the user and wherein the water quality of water received from the municipal water source or the well water source is determined by the testing of the plurality of used water filters from the given geographic area.

5. A method for appliance water filter replenishment when substantially all or all of a useful life of a water filter has been reached or exceeded comprising the steps of:
enrolling a water filter user in an appliance water filter exchange program using a website or mobile device application whereby the water filter user elects to participate in the appliance water filter exchange program and provides water filter user identifying information;
installing a water filter into a water filter head assembly of an appliance;
filtering water using the installed water filter during a filter use state until the installed water filter has reached or exceeded its useful life and the installed water filter is a used water filter;
the water filter user receiving a container for the used water filter;
delivering the used water filter to a testing facility;
testing a water quality of water from the used water filter after it has passed through the used water filter;
shipping a replacement water filter to the water filter user;
delivering the replacement water filter to the water filter user; and
wherein the appliance is connected with a water filter provider using a wired connection or a wireless connection to connect the appliance with a server via a global communication network of computer servers.

6. The method of claim 5, wherein the step of delivering the replacement water filter to the water filter user is automatically done without further water filter user input after the enrolling step and the replacement water filter is an appliance water filter.

7. The method of claim 5, wherein the step of delivering the replacement water filter to the water filter user is automatically done by the filter communicating to the appliance that it has reached its notification state when substantially all or all of the useful life of the water filter has been reached or exceeded and the appliance communicating to the water filter provider that a replacement water filter is needed.

8. The method of claim 5, wherein the step of delivering the used water filter to a testing facility comprises mailing the used water filter to the testing facility in a self-addressed container previously delivered to the user at the water filter user's address.

9. The method of claim 5 further comprising the steps of:
creating a water report; and
delivering the water report to the water filter user.

10. The method of claim 5 further comprising the step of:
testing a plurality of used water filters for a given geographic area; and
wherein the step of delivering a replacement water filter to the water filter user comprises delivering a geographically tailored water filter that is designed to filter water more effectively within the geographic area when installed and used by the water filter user.

11. The method of claim 10, wherein the appliance is connected with a water filter provider using a wired connection or a wireless connection to connect the appliance with a server via a global communication network of computer servers.

12. The method of claim 11, wherein the water filter provider initiates a signal communication with the appliance and the water filter and periodically obtains information about the water filter.

13. The method of claim 5, wherein the water filter has a water filter memory storage unit and the water filter memory storage unit includes data that may be used to display one or more of the following: pieces of status or history information about the water filter to a user via a user interface: a time period of use of the water filter; a volume of water that has flowed through the filter; a percentage of use or percentage of remaining useful life of the filter; a model of the filter; and a model of the appliance to which the filter was initially engaged.

14. The method of claim 5, wherein the water filter includes a memory storage unit in communication with the water filter provider further comprising the step of an initial start-up protocol, wherein the initial start-up protocol includes a set of encrypted instructions saved within the memory storage unit of the water filter wherein the encrypted instructions defining the initial start-up protocol are saved within the memory storage unit.

15. The method of claim 5, wherein the step of delivering a replacement water filter comprises delivering the replacement filter to the user at the water filter user's address and the replacement water filter is a geographically tailored water filter for a given geographic area.

16. The method of claim 5, wherein the replacement water filter is tailored to treat water based upon analyzed water characteristics within a geographic area that the water filter user resides in.

17. The method of claim 16, wherein the replacement water filter is tailored to treat the analyzed water characteristics within a geographic area that the water filter user resides and is based upon testing conducted on a plurality of used water filters from the geographic area.

18. The method of claim 5, wherein the water filter comprises a water filter housing defining an interior volume; and
a water treatment medium within the interior volume of the housing wherein the water treatment medium is selected to treat water from a municipal water source or a well within a geographic area based on aggregated test results conducted on a plurality of used residential water filters previously used in appliances within the geographic area.

19. The method of claim 5 further comprising the step of providing a notification to a user via a mobile computing device based on water quality measured by a refrigerator, the filter, or water quality data received from testing done on other filters used in other appliances proximate or within a predetermined distance of the user's appliance.

20. A method of providing for water filter replenishment when an effective useful life of a refrigerator water filter has been reached or exceeded comprising the steps of:
enrolling a water filter user in a refrigerator water filter exchange program using a website or mobile device application whereby the water filter user elects to participate in the refrigerator water filter exchange program and provides water filter user identifying information;
testing a plurality of used water filters from a given geographic area and producing testing results to determine a tested quality of water provided by a water source within the given geographic area;
providing a geographically tailored refrigerator water filter designed to treat the tested quality of water from the water source within the given geographic area to a user located in the given geographic area based upon the testing results;

installing the geographically tailored refrigerator water filter in a refrigerator;

filtering water using the installed geographically tailored refrigerator water filter during a filter use state until the installed geographically tailored refrigerator water filter reaches its notification state when the effective useful life of the refrigerator water filter has been reached or exceeded and the installed geographically tailored refrigerator water filter is a used refrigerator water filter; and delivering a replacement geographically tailored refrigerator water filter to the water filter user; and wherein the refrigerator is connected with a water filter provider using a wired connection or a wireless connection to connect the refrigerator with a server via a global communication network of computer servers.

* * * * *